Patented Aug. 7, 1945

2,381,497

UNITED STATES PATENT OFFICE 2,381,497

ANTIFRICTION ALLOY

Franz R. Hensel and Earl I. Larsen, Indianapolis, Ind., assignors to P. R. Mallory & Co., Inc., Indianapolis, Ind, a corporation of Delaware No Drawing. Application February 4, 1942, Serial No. 429,503

3 Claims. (Cl. 75—163)

This invention relates to copper base anti-friction alloys. It is an object of the present invention to provide an improved copper base alloy particularly suitable for an anti-friction material or bearing.

It is a further object of the invention to provide a bearing metal which has a low coefficient of friction and which has a high thermal conductivity.

Another object of the invention is to provide a bearing metal which possesses the ability to "run in" and to conform to local excess pressures.

The present invention comprises the combination of elements, methods of manufacture, and the product thereof brought out and exemplified in the disclosure hereinafter set forth, the scope of the inventoin being indicated in the appended claims.

While a preferred embodiment of the invention is described herein, it is cointemplated that considerable variation may be made in the method of procedure and the combination of elements without departing from the spirit of the invention.

In the prior art, bearings have been formed of copper or bronze containing various percentages of lead. While such bearings have performed with considerable satisfaction and have relatively high strength combined with low friction qualities, such bearings have not always been satisfactory in all particulars. For example, it has been difficult to obtain uniform distribution of lead throughout the copper matrix and this has resulted in some non-uniformity of bearing properties.

Bearings of the type described are frequently bonded to a steel backing for additional strength and support. Such bonding requires the application of relatively high temperatures for a comparatively long period of time. Such prolonged heating, however, interferes with the proper distribution of lead and promotes the accumulation of the lead in relatively large globules. Such large size lead inclusions are not as effective in promoting a bearing of uniformly low friction as are uniformly distributed fine particles of lead.

Lead is also subject to a certain amount of oil corrosion when used in bearings.

According to the present invention, anti-friction materials are produced of copper base alloys containing lead and one or both of the metals uranium and thorium. It is contemplated that alloys may be produced according to the present invention having the following approximate composition:

| | Per cent |
|---|---|
| Uranium and/or thorium | .01 to 10 |
| Lead | 1 to 35 |
| Copper | Substantially the balance |

The range of lead given above covers a number of classes of bearings. The lower percentages of lead are particularly useful for bearings which operate without the support of steel backings. These alloys are generally used in the form of castings or, in some cases, forgings. Alloys with lower lead content are also to be recommended where the bearings may be subject to impact. The alloys with higher lead contents usually require a steel backing and are able, under these conditions, to withstand a high unit bearing pressure. Alloys with lead contents ranging from 25 to 35% are most useful for such applications as bearings in automotive engines, Diesel motors, aircraft engines and the like. These bearings are usually backed up with steel or other strong metal. Since the use of bearings are manifold, the alloy compositions must be varied with the specific requirements.

It is contemplated that in some cases small amounts of other ingredients may be present in the bearing metal, particularly those commonly used in copper-lead bearings, such as silver and tin; and deoxidizers and promoters of lead distribution, such as lithium, calcium and zirconium.

Uranium and thorium form eutectic compositions with copper. Only a small quantity of either uranium or thorium is taken up in solid solution. This is responsible for retaining a very high thermal conductivity in the copper matrix. Furthermore, the hardness of the alloy is not raised to such a point where it becomes objectionable for bearing applications.

In most of copper-lead alloys made heretofore there has existed a certain amount of porosity. As a matter of fact, all copper-lead bearings for high-quality applications must be X-rayed in order to be sure that this porosity is not excessive. The porosity in these bearings is primarily responsible for fatigue failures because any inconsistencies in the material and particularly any voids with sharp contours will cause stress concentrations and may result in subsequent failure due to the localized high stresses. The mechanical type of stresses may be further increased due to heat stresses if a matrix is used which has a low thermal conductivity. The equalization of heat stresses is more efficient in a material of high thermal conductivity.

Uranium and thorium have a high deoxidizing power as can be judged from the heat of formation of their oxides. Therefore, the addition of either uranium or thorium will assure a completely deoxidized melt into which the lead may be added. This will insure that no additional lead oxides are formed which, on solidification, will cause the formation of blow-holes. Furthermore, both uranium and thorium are chemically closely related to and readily alloy with lead. This affinity provides for a rapid alloying action. Furthermore, the eutectic structure in the copper matrix caused by the addition of uranium and thorium provides for a large number of nuclei around which the lead particles will be uniformly distributed. The lead is for the most part distributed in the alloy as small discrete particles at the grain boundaries of the copper alloy matrix.

In our experimental work we have made alloys in which the materials thorium and uranium were added to the melt as such, and we have also made experiments where master alloys were first prepared which were then added to the molten copper. It must be pointed out here that great caution must be taken that the uranium and thorium be free of hydrogen before it is added to the copper melt. It is one of the peculiarities of these materials that they form hydrides very readily. Therefore, the preparation of master alloys of copper and thorium or copper and uranium should not be performed in a hydrogen atmosphere. If hydrogen is present a substantial amount of the hydrogen is retained even after cooling which will cause blowing of the copper-lead alloys. We have found that the best method of producing copper-uranium and copper-thorium master alloys is by fusing the mixture in a vacuum or under low pressures. Instead of total fusing, a sintering process also can be employed to produce such master alloys.

In addition to copper base master alloys, other uranium or thorium master alloys, such as a 66% uranium-34% nickel alloy may be used. This alloy is prepared in vacuum.

A considerable percentage of the thorium or the uranium is used up by the final melt in effecting complete deoxidation and removal of the oxygen from both the copper and the lead. In certain cases as much as 50% to 75% is lost. However, even with a retained amount of .05% thorium or uranium the beneficial effects of these elements are very noticeable.

The fused master alloys of copper or nickel with uranium or thorium are quite different in their behavior, as far as hydrogen gas absorption is concerned, than the pure metals. These master alloys are much less active and are, therefore, preferred for the manufacture of the alloys described in the present application. It is understood, however, that the pure metals may be used provided proper precaution is taken and gases are removed before such metals are added to the alloy melts.

The final alloys are prepared by melting the copper in a graphite crucible as rapidly as possible, then adding the uranium or thorium, or the master alloy thereof, then adding the lead, stirring the mixture thoroughly and pouring into a graphite mold which is heated to approximately 100° C.

For the manufacture of actual bearing shells containing 30% lead and .5% uranium and/or thorium, the molten material is cast into a preheated steel shell either under flux or in a non-oxidizing atmosphere.

Compositions which have been found useful and which are given by way of example are the following:

| | Per cent |
|---|---|
| A. Lead | 25 |
| Uranium and/or thorium | .5 |
| Copper | Balance |
| B. Lead | 30 |
| Silver | 1 |
| Uranium and/or thorium | 1 |
| Copper | Balance |
| C. Lead | 28 |
| Nickel | 2 |
| Uranium | .5 |
| Copper | Balance |
| D. Lead | 20 |
| Uranium and/or thorium | 5 |
| Copper | Balance |

In order to obtain these final compositions, it will be understood that substantial excesses of the uranium or thorium or the master alloys must be added to the melt. The necessary excess may amount to 100% or more in some cases due to the amount used up in deoxidizing the melt.

The resulting alloy shows outstanding advantages as an anti-friction material, particularly for bearings.

It has a low coefficient of friction.

The lead is uniformly distributed as small particles throughout the metal body.

The material is not readily subject to fatigue or scoring under heavy loads and at high speeds.

It has a high thermal conductivity rendering it able to equalize heat stresses rapidly.

It has the ability to "run in" and conform to local areas of excess pressure.

It may be readily bonded to steel and this can be accomplished without excessive lead segregation.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A copper base alloy containing 1 to 35% lead and .01 to 10% of metal selected from the group consisting of uranium and thorium.

2. An anti-friction material comprising an alloy of 1 to 35% lead, .01 to 10% of metal selected from the group consisting of uranium and thorium, and the balance substantially all copper.

3. A bearing comprising an alloy of 1 to 35% lead, .01 to 10% of metal selected from the group consisting of uranium and thorium and the balance substantially all copper, said alloy having the lead uniformly distributed therethrough as small discrete particles at the grain boundaries of the copper base matrix.

FRANZ R. HENSEL.
EARL I. LARSEN.